US012610052B2

(12) United States Patent
Yedidi et al.

(10) Patent No.: US 12,610,052 B2
(45) Date of Patent: Apr. 21, 2026

(54) ENHANCED VIDEO CODING USING REGION-BASED ADAPTIVE QUALITY TUNING

(71) Applicant: Intel Corporation, Santa Clara, CA (US)

(72) Inventors: Satya Yedidi, Roseville, CA (US); Sai Agnihotri, Newark, CA (US); Shriram Deshpande, Rancho Cordova, CA (US); Aaron McKenney, Fair Oaks, CA (US)

(73) Assignee: Intel Corporation, Santa Clara, CA (US)

( * ) Notice: Subject to any disclaimer, the term of this patent is extended or adjusted under 35 U.S.C. 154(b) by 842 days.

(21) Appl. No.: 17/645,602

(22) Filed: Dec. 22, 2021

(65) Prior Publication Data

US 2022/0116611 A1 Apr. 14, 2022

(51) Int. Cl.
*H04N 19/126* (2014.01)
*H04N 19/176* (2014.01)
(Continued)

(52) U.S. Cl.
CPC ......... *H04N 19/126* (2014.11); *H04N 19/176* (2014.11); *H04N 19/182* (2014.11); *H04N 19/196* (2014.11)

(58) Field of Classification Search
CPC .... H04N 19/176; H04N 19/70; H04N 19/124; H04N 19/117; H04N 19/46;
(Continued)

(56) References Cited

U.S. PATENT DOCUMENTS

2019/0238849 A1* 8/2019 Fang ................... H04N 19/124

OTHER PUBLICATIONS

"FFmpeg: compat/nvenc/nvEncodeAPI.h Source File," Retrieved on Nov. 6, 2025 from https://www.ffmpeg.org/doxygen/3.2/nvEncodeAPI_8h_source.html, 31 pages.
(Continued)

*Primary Examiner* — Farhan Mahmud
(74) *Attorney, Agent, or Firm* — Hanley, Flight & Zimmerman, LLC

(57) ABSTRACT

This disclosure describes systems, methods, and devices related to generating region-based quantization parameters for video encoding. A method may include receiving, at a hardware encoder, source video comprising video frames; receiving, at the hardware encoder, from software associated with the hardware encoder, a video frame-level quantization parameter for a first video frame of the video frames; receiving, at the hardware encoder, from an application, a delta quantization parameter map, the delta quantization parameter map comprising per-pixel block quantization parameter modifications for respective pixel blocks of the first video frame; determining, by the hardware encoder, for the respective pixel blocks, respective sums of the per-pixel block quantization parameter modifications and the video frame-level quantization parameter; generating, by the hardware encoder, quantization parameters for the respective pixel blocks, the quantization parameters being the respective sums; and generating, by the hardware encoder, a bitstream based on the video frames and the quantization parameters.

20 Claims, 5 Drawing Sheets

(51) Int. Cl.
 *H04N 19/182* (2014.01)
 *H04N 19/196* (2014.01)
(58) Field of Classification Search
 CPC .. H04N 19/593; H04N 19/159; H04N 19/136;
  H04N 19/86; H04N 19/157; H04N
   19/463
 See application file for complete search history.

(56) References Cited

OTHER PUBLICATIONS

"Nvidia Video Codec SDK Application Note—Encoder," Application Note, NVENC_DA-06209-001_v08, Nov. 2016, Nvidia, 11 pages.
"Nvidia Video Codec SDK—Encoder," Programming Guide, Nvidia, vNVENCODEAPI_PG-06155-001_v11, Oct. 2021, 42 pages.

* cited by examiner

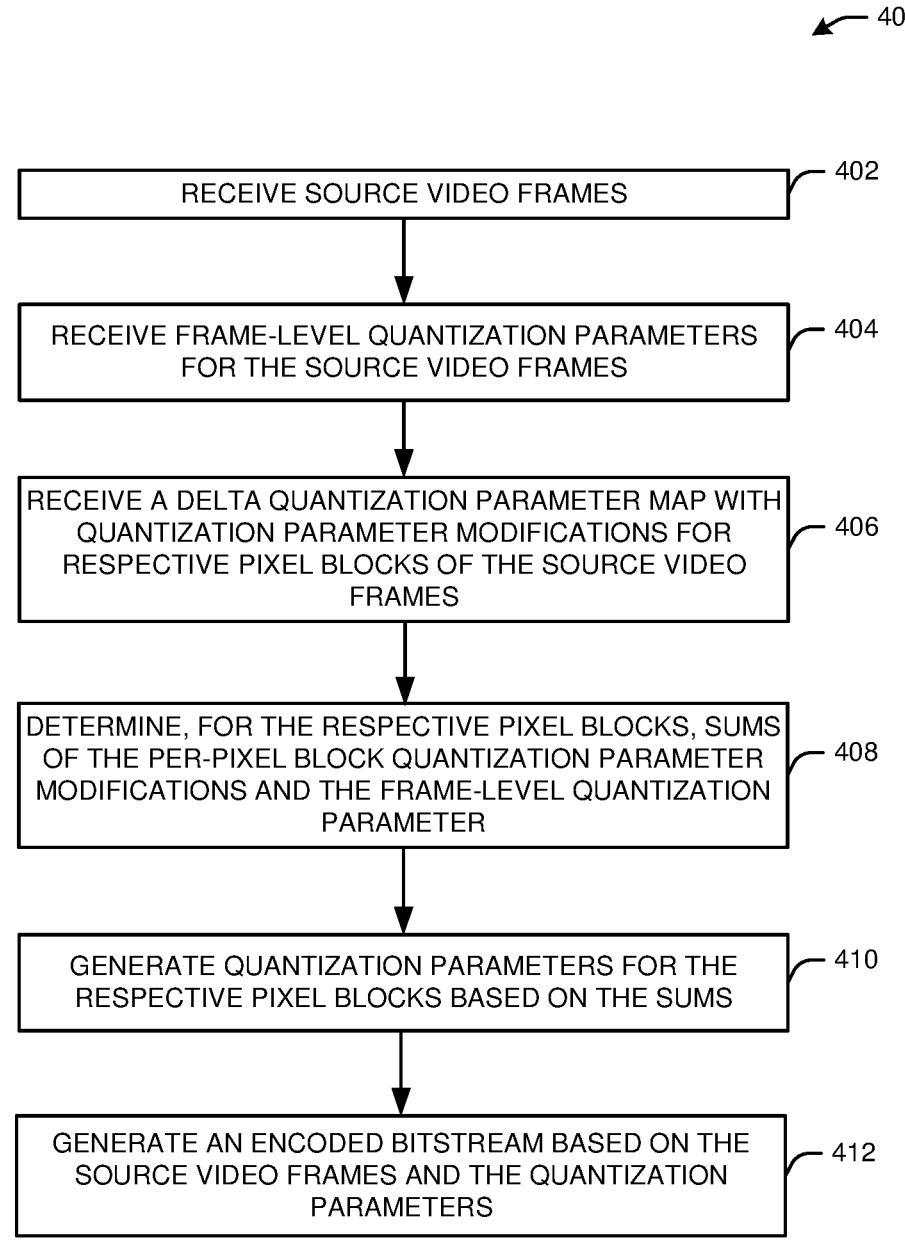

400

RECEIVE SOURCE VIDEO FRAMES — 402

RECEIVE FRAME-LEVEL QUANTIZATION PARAMETERS FOR THE SOURCE VIDEO FRAMES — 404

RECEIVE A DELTA QUANTIZATION PARAMETER MAP WITH QUANTIZATION PARAMETER MODIFICATIONS FOR RESPECTIVE PIXEL BLOCKS OF THE SOURCE VIDEO FRAMES — 406

DETERMINE, FOR THE RESPECTIVE PIXEL BLOCKS, SUMS OF THE PER-PIXEL BLOCK QUANTIZATION PARAMETER MODIFICATIONS AND THE FRAME-LEVEL QUANTIZATION PARAMETER — 408

GENERATE QUANTIZATION PARAMETERS FOR THE RESPECTIVE PIXEL BLOCKS BASED ON THE SUMS — 410

GENERATE AN ENCODED BITSTREAM BASED ON THE SOURCE VIDEO FRAMES AND THE QUANTIZATION PARAMETERS — 412

FIG. 4

ENHANCED VIDEO CODING USING REGION-BASED ADAPTIVE QUALITY TUNING

TECHNICAL FIELD

This disclosure generally relates to systems and methods for video coding and, more particularly, to video coding using region-based adaptive coding quality tuning.

BACKGROUND

Video coding can be a lossy process that sometimes results in reduced quality when compared to original source video. Video coding standards are being developed to improve video quality.

BRIEF DESCRIPTION OF THE DRAWINGS

FIG. 4 illustrates a flow diagram of an illustrative process for region-based adaptive quality tuning for video coding, in accordance with one or more example embodiments of the present disclosure.

DETAILED DESCRIPTION

Figure 1:
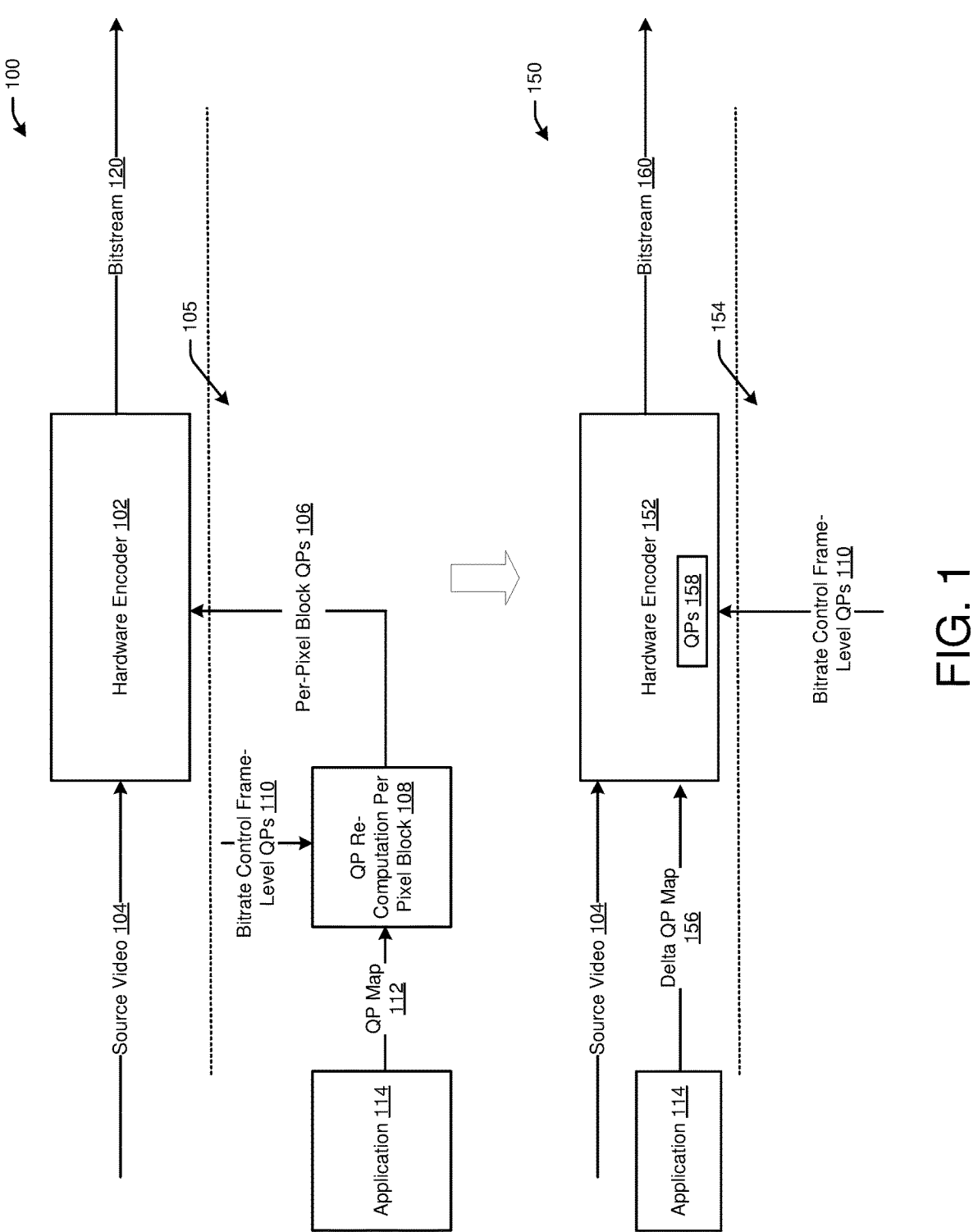
FIG. 1 are example systems illustrating components of encoding hardware and software for generating quantization parameters for video encoding, according to some example embodiments of the present disclosure.

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

A typical video encoding and decoding system may include a transmitting device configured to receive source video and compress (e.g., encode) video data of the source video for transmission to a receiving device. This compressed data may be transmitted to the receiving device as a "bitstream." The receiving device may be configured to decode the compressed video data received from the transmitting device. For example, the transmitting device may be a source of video content and the receiving device may be a device on which a viewer is watching the video content (and/or the receiving device may be a third device that may decode the video and provide the decoded video content to the device on which the viewer is watching the video content). The video content at the source may be compressed to maximize video quality and throughput by allowing a video frame including a large number of pixels to be compressed into a smaller amount of data to provide for quicker transmission and processing at the receiving device.

Video encoders in some applications, such as game or other video streaming, video conferencing, and video surveillance, often need to support region-based quality improvements and tuning for compression gain without perceived quality loss (e.g., balancing the need for more compression without the quality loss). The quality improvement may be achieved by modulating the quantization parameter (QP) per pixel block (e.g., macro block or largest coding unit) across a frame. The quantization process in video encoding regulates the correction/reproduction error between the predicted pixels and the reference pixels to achieve compression. A lower QP means that the correction aims to reduce reproduction error, improving quality at the expense of bitstream size (e.g., because a lower QP means less compression), whereas a higher QP means that the correction aims to reduce bitstream size at the expense of reproduction error/quality (e.g., more compression, but less visual quality).

The encoding process may involve at least the following operations. First, a video frame may be received in the form of a number of pixels. The video frame may be separated into different coding units (CU), which may include groups of pixels included in the frame and/or information associated with the pixels, such as luma and chroma information. A predicted block may be generated, which may involve comparing the pixel data associated with the current frame to a reference image, which may be representative of a previously coded frame in the video content (e.g., inter-coding), and/or which may be representative of previously coded pixel data of the same frame (e.g., intra-coding). The predicted block then may be subtracted (e.g., at a subtractor) from the current block of original image data, and the resulting residual (e.g., representing the difference/error between the predicted block and the original image data) may be partitioned into one or more transform blocks (TUs). The TUs may then be provided to a forward transform stage at which the pixel data included in the TU is converted into a domain of transform coefficients. Following this, the transformed TU is provided to a quantizer stage. The forward transform and the quantizer stages can transform the divided residual data into transform coefficients using discrete cosine transform (DCT) for example. Using a quantization parameter (QP) set by the system, the transform and quantizer then uses lossy resampling or quantization on the coefficients. The frames and residuals along with supporting or context data block size and so forth may be entropy encoded by the coder and transmitted to the receiving device. The forward transform process may involve multiplying the TU matrix (for example, a 4×4 TU would be a matrix including four rows and four columns) by a constant matrix including pre-determined constant values.

The output of the transform and quantizer may be provided to the inverse transform and quantizer to generate the same reference or reconstructed blocks, frames, or other units as would be generated at a decoder such as decoder. Thus, the prediction unit may use the inverse transform and quantizer, adder, and filter to reconstruct the frames.

Application software (e.g., for game or other video streaming, video conferencing, and video surveillance applications) may be aware of the regions of a video frame that may be encoded with varying degrees of quality. Such information may be prepopulated in the form of a QP surface that may be fetched and applied by the hardware encoder.

Static regions of a scene (e.g., of a video frame) that have less important details (e.g., sky, still water, etc. in a video, fixed backgrounds in video conferencing, blurred/flat areas during fade in/fade out, frame edges, and the like) can be encoded with a higher QP to achieve compression gains with no perceived quality impact. A frame quality model is provided to a hardware encoder through a frame-level QP map/surface for block-level QP control across the frame. Machine learning techniques can be used to generate the frame quality model/QP map.

However, the block-level QP control is based on the frame-level QP calculated by bit rate control (BRC) for meeting the target bit rates for any application. Rate control algorithms refine the encoder parameters (e.g., QP) to meet the target/demanded bit rates for a bitstream. This generally results in a significant software overhead to re-compute the block-level QP for the entire frame using the application-programmed QP map and the BRC target frame-level QP. In particular, the QP map with regional QP information needs to aggregated with the BRC-generated frame-level QP for each pixel block of a frame, resulting in significant software overhead. For example, a new QP needs to be determined (e.g., by software) for each pixel block based on the region-specific QP and the BRC-generated QP. Because the region-specific QP is absolute (e.g., not relative to the frame-level QP), the QP computation for a given pixel block may be resource-intensive.

There is therefore a need for enhanced region-based adaptive quality turning for video encoding.

In one or more embodiments, an application may provide a "delta QP" surface into a hardware encoder (e.g., as opposed to providing an absolute QP to the encoder), which may generate an aggregate QP based on the BRC frame-level QP and the delta QP on a per-block basis, thereby eliminating the external software overhead needed to recalculate the QP for each pixel block, achieving increased performance and power savings.

In one or more embodiments, flexible delta QP control defined herein eliminates software/kernel overhead needed to recalculate a QP map (e.g., as a function of frame-level BRC-generated QP and the application-programmed region-based QP map) by providing a direct stream-in interface with which an application may provide a delta QP per pixel block for an entire frame, independent of the frame-level BRC-generated QP. The encoder hardware may use the delta QP and the frame-level BRC-generated QP to generate an aggregate QP per pixel block, and used to encode a bit-stream. As a result, the external resources needed to recalculate the QP map may be eliminated.

In one or more embodiments, the delta QP may be an indication of how much (e.g., delta) to adjust the QPs of respective pixel blocks of one frame (e.g., with respect to the frame-level QP). The application that provides the delta QP may not be aware of the BRC-generated frame-level QP, but may set the delta QP value of respective pixel blocks based on whether to use higher or lower QPs in the encoding of the respective pixel blocks. For example, when a frame-level QP is 30 (e.g., as generated by the BRC), and a delta QP value for a pixel block (e.g., a higher quality visual area, such as the center of a frame) is −8 (e.g., the smaller value indicating that less quantization should be applied), then the QP for the pixel block may be decreased to 22 (e.g., 30−8=22). When the delta QP value for a pixel block (e.g., a background block near the edge of a frame) is 11 (e.g., the larger value indicating that more quantization should be applied), the QP for the pixel block may be 41 (e.g., 30+11=41). In contrast, when existing techniques use an absolute QP for a given pixel block (e.g., as provided by an application), the software may have to cap the QP for the given pixel block if the absolute QP goes beyond the frame-level QP set by the BRC. In this manner, the existing techniques relying on the absolute QP for given pixel blocks lack the relative difference between the block-level QP set by the application and the frame-level QP set by the BRC, and have to adjust the block-level QPs based on the frame-level QPs. In contrast, the enhanced techniques herein using the delta QP may more easily adjust the block-level QPs based on the frame-level QPs, and may perform such calculations with the encoder hardware instead of in software.

In one or more embodiments, the encoder hardware may generate an aggregate QP for any pixel block in a frame according to the equation: $QP_{Aggregate}=\text{Clamp}[QP_{BRC}+(\pm DeltaQP_{stream-in})]_{QP_{min}/QP_{max}}$, where $DeltaQP_{stream-in}$ is the delta QP streamed into the hardware encoder from the application (e.g., a positive/negative signed value), the $QP_{BRC}$ is the BRC-generated frame-level QP (e.g., unsigned value), and the $QP_{Aggregate}$ is the final QP used for bitstream encoding of a respective pixel block (e.g., an unsigned per-block value). Thus, the $QP_{Aggregate}$ equation may be used for each pixel block in a frame to generate the final QP to use in the encoding of the pixel block. In addition, the $\text{Clamp}[ \ ]_{QP_{min}/QP_{max}}$ function may be used to set a floor and ceiling for the $+DeltaQP_{stream-in}$. For example, when the minimum QP $QP_{min}$ is 10 and the maximum QP $QP_{max}$ is 51, the $QP_{Aggregate}$ values must stay within the range of −10:51. Clamping may be applied based on the absolute $QP_{min}/QP_{max}$.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 are example systems illustrating components of encoding hardware and software for generating quantization parameters for video encoding, according to some example embodiments of the present disclosure.

Referring to FIG. 1, a system 100 may include a hardware encoder 102 that receives raw source video 104 to be encoded. From a software layer 105, the hardware encoder 104 may receive per-pixel block QPs 106 that may be re-calculated by the software layer 105 at a per-pixel block re-computation 108 based on BRC-generated frame-level QPs 110 (e.g., generated based on a target bitrate for a video stream) and based on a QP map 112 (e.g., an absolute region-based QP map) provided by an application 114. For example, the application 114 may generate the QP map 112 based on known pixel regions of video frames to be encoded using higher and lower QPs. The hardware encoder 102 may generate an encoded bitstream 102 using the per-pixel block QPs 106, but at the significant expense of the software layer 105 having to generate the per-pixel block QPs 106 based on the QP map 112 and the BRC-generated frame-level QPs 110.

Still referring to FIG. 1, a system 150 may include a hardware encoder 152 that may receive the raw source video 104 to be encoded. The hardware encoder 152 also may receive, from a software layer 154, the BRC-generated frame-level QPs 110. The hardware encoder also may receive, from the application 114, a delta QP map 156. Using the generated frame-level QPs 110 and the delta QP map 156 (e.g., showing the QP deltas on a per-pixel block basis), the hardware encoder 152 may generate QPs 158 to be used in the quantization process for encoding. Based on the QPs 158 generated by the hardware encoder 152, the hardware encoder 152 may generate a bitstream 160. The process by which the bitstream 160 is generated using the QPs 158 is described further with respect to FIG. 3.

In one or more embodiments, the QPs 158 may be aggregate QP for any pixel block in a frame according to the equation: $QP_{Aggregate}$=Clamp $[QP_{BRC}$+ $(\pm DeltaQP_{stream-in})]_{QP_{min}/QP_{max}}$, where $DeltaQP_{stream-in}$ is the delta QP streamed into the hardware encoder from the application (e.g., a positive/negative signed value), the $QP_{BRC}$ is the BRC-generated frame-level QP (e.g., unsigned value), and the $QP_{Aggregate}$ is the final QP used for bitstream encoding of a respective pixel block (e.g., an unsigned per-block value). Thus, the $QP_{Aggregate}$ equation may be used for each pixel block in a frame to generate the final QP to use in the encoding of the pixel block. An example of the delta QP map 156 is shown in FIG. 2.

In one or more embodiments, the hardware encoder 152 generates the QPs 158 instead of relying on the software layer 154 to generate the per-pixel block QPs 106 as generated by the software layer 105 in the system 100, relieving the software layer 154 of significant computation.

Figure 2:
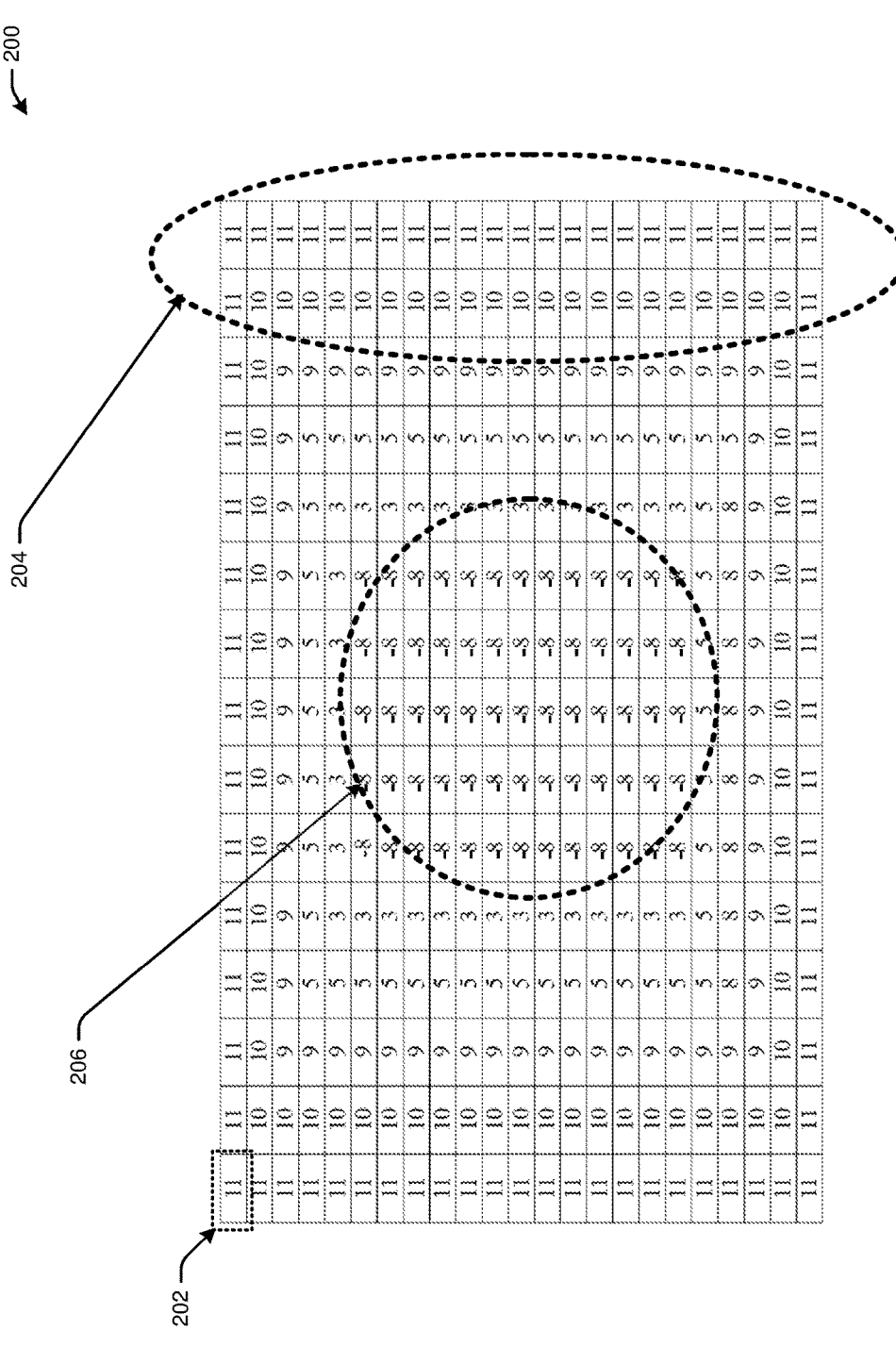
FIG. 2 shows an example delta quantization parameter map for video encoding, in accordance with one or more example embodiments of the present disclosure.

FIG. 2 shows an example delta QP map 200 for video encoding, in accordance with one or more example embodiments of the present disclosure.

Referring to FIG. 2, the delta QP map 200 may represent the delta QP map 156 of FIG. 1, and may represent the QP delta values for respective pixel blocks of a video frame. For example, the entire box shown in FIG. 2 may represent a video frame, with each cell 202 (e.g., as in a table/grid entry) representing a block of pixels of the video frame. As shown, each block of pixels may have a corresponding signed numerical value. For example, an outer region 204 of the video frame may include higher delta QP values (e.g., 10 and 11 as shown). A center region 206 of the video frame may include lower delta QP values (e.g., –8 as shown). The higher delta QP values indicate areas for which an application (e.g., the application 114 of FIG. 1) has identified a focus on higher compression, and the lower delta QP values indicate areas for which the application has identified a focus on lower compression. For example, higher compression may be applied to background pixel blocks, static objects, outer edges, and the like (e.g., areas of less focus for a viewer). Less compression may be applied to areas of higher focus for a viewer, such as objects, people, the center of a video frame, and the like. The delta QP map 200 represents a single delta QP map for a single video frame, but other delta QP maps with the same and/or different delta values per pixel blocks may represent additional video frames. In this manner, a bitstream may include multiple encoded video frames, each video frame encoded using a respective delta QP map.

Figure 3:
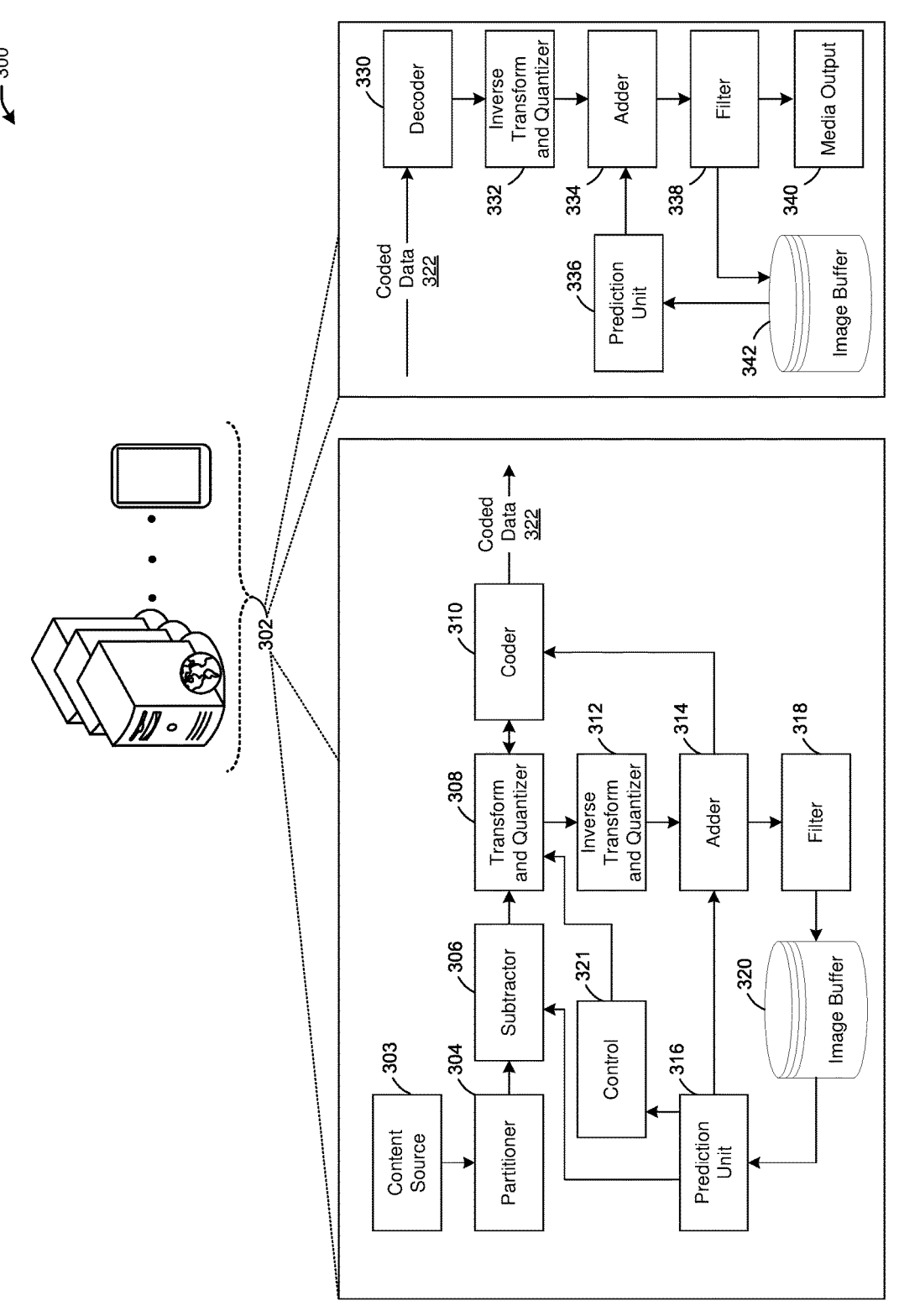
FIG. 3 is an example system illustrating components of encoding and decoding devices, according to some example embodiments of the present disclosure.

FIG. 3 is an example system 300 illustrating components of encoding and decoding devices, according to some example embodiments of the present disclosure.

Referring to FIG. 3, the system 300 may include devices 302 having encoder and/or decoder components. As shown, the devices 302 may include a content source 303 that provides video and/or audio content (e.g., a camera or other image capture device, stored images/video, etc.). The content source 303 may provide media (e.g., video and/or audio) to a partitioner 304, which may prepare frames of the content for encoding. A subtractor 306 may generate a residual as explained further herein. A transform and quantizer 308 may generate and quantize transform units to facilitate encoding by a coder 310 (e.g., entropy coder). Transform and quantized data may be inversely transformed and inversely quantized by an inverse transform and quantizer 312. An adder 314 may compare the inversely transformed and inversely quantized data to a prediction block generated by a prediction unit 316, resulting in reconstructed frames. A filter 318 (e.g., in-loop filter for resizing/cropping, color conversion, de-interlacing, composition/blending, etc.) may revise the reconstructed frames from the adder 314, and may store the reconstructed frames in an image buffer 320 for use by the prediction unit 316. A control 321 may manage many encoding aspects (e.g., parameters) including at least the setting of a quantization parameter (QP) but could also include setting bitrate, rate distortion or scene characteristics, prediction and/or transform partition or block sizes, available prediction mode types, and best mode selection parameters, for example, based at least partly on data from the prediction unit 316. Using the encoding aspects, the transform and quantizer 308 may generate and quantize transform units to facilitate encoding by the coder 310, which may generate coded data 322 that may be transmitted (e.g., an encoded bitstream).

Still referring to FIG. 3, the devices 302 may receive coded data (e.g., the coded data 322) in a bitstream, and a decoder 330 may decode the coded data, extracting quantized residual coefficients and context data. An inverse transform and quantizer 332 may reconstruct pixel data based on the quantized residual coefficients and context data. An adder 334 may add the residual pixel data to a predicted block generated by a prediction unit 336. A filter 338 may filter the resulting data from the adder 334. The filtered data may be output by a media output 340, and also may be stored as reconstructed frames in an image buffer 342 for use by the prediction unit 336.

Referring to FIG. 3, the system 300 performs the methods of intra prediction disclosed herein, and is arranged to perform at least one or more of the implementations described herein including intra block copying. In various implementations, the system 300 may be configured to undertake video coding and/or implement video codecs according to one or more standards. Further, in various forms, video coding system 300 may be implemented as part of an image processor, video processor, and/or media processor and undertakes inter-prediction, intra-prediction, predictive coding, and residual prediction. In various implementations, system 500 may undertake video compression and decompression and/or implement video codecs according to one or more standards or specifications, such as, for example, H.264 (Advanced Video Coding, or AVC), VP8, H.265 (High Efficiency Video Coding or HEVC) and SCC extensions thereof, VP9, Alliance Open Media Version 1 (AV1), H.266 (Versatile Video Coding, or VVC), DASH (Dynamic Adaptive Streaming over HTTP), and others. Although system 300 and/or other systems, schemes or processes may be described herein, the present disclosure is not necessarily always limited to any particular video coding standard or specification or extensions thereof.

As used herein, the term "coder" may refer to an encoder and/or a decoder. Similarly, as used herein, the term "coding" may refer to encoding via an encoder and/or decoding via a decoder. A coder, encoder, or decoder may have components of both an encoder and decoder. An encoder may have a decoder loop as described below.

For example, the system 300 may be an encoder where current video information in the form of data related to a sequence of video frames may be received to be compressed. By one form, a video sequence (e.g., from the content source 303) is formed of input frames of synthetic screen content such as from, or for, business applications such as word processors, power points, or spread sheets, computers, video games, virtual reality images, and so forth. By other forms, the images may be formed of a combination of synthetic screen content and natural camera captured images. By yet another form, the video sequence only may be natural camera captured video. The partitioner 304 may partition each frame into smaller more manageable units, and then compare the frames to compute a prediction. If a difference or residual is determined between an original block and prediction, that resulting residual is transformed and quantized, and then entropy encoded and transmitted in a bitstream, along with reconstructed frames, out to decoders or storage. To perform these operations, the system 300 may receive an input frame from the content source 303. The input frames may be frames sufficiently pre-processed for encoding.

The system 300 also may manage many encoding aspects including at least the setting of a quantization parameter (QP) but could also include setting bitrate, rate distortion or scene characteristics, prediction and/or transform partition or block sizes, available prediction mode types, and best mode selection parameters to name a few examples.

The output of the transform and quantizer 308 may be provided to the inverse transform and quantizer 312 to generate the same reference or reconstructed blocks, frames, or other units as would be generated at a decoder such as decoder 330. Thus, the prediction unit 316 may use the inverse transform and quantizer 312, adder 314, and filter 318 to reconstruct the frames.

The prediction unit 316 may perform inter-prediction including motion estimation and motion compensation, intra-prediction according to the description herein, and/or a combined inter-intra prediction. The prediction unit 316 may select the best prediction mode (including intra-modes) for a particular block, typically based on bit-cost and other factors. The prediction unit 316 may select an intra-prediction and/or inter-prediction mode when multiple such modes of each may be available. The prediction output of the prediction unit 316 in the form of a prediction block may be provided both to the subtractor 306 to generate a residual, and in the decoding loop to the adder 314 to add the prediction to the reconstructed residual from the inverse transform to reconstruct a frame.

The partitioner 304 or other initial units not shown may place frames in order for encoding and assign classifications to the frames, such as I-frame, B-frame, P-frame and so forth, where I-frames are intra-predicted. Otherwise, frames may be divided into slices (such as an I-slice) where each slice may be predicted differently. Thus, for HEVC or AV1 coding of an entire I-frame or I-slice, spatial or intra-prediction is used, and in one form, only from data in the frame itself.

In various implementations, the prediction unit 316 may perform an intra block copy (IBC) prediction mode and a non-IBC mode operates any other available intra-prediction mode such as neighbor horizontal, diagonal, or direct coding (DC) prediction mode, palette mode, directional or angle modes, and any other available intra-prediction mode. Other video coding standards, such as HEVC or VP9 may have different sub-block dimensions but still may use the IBC search disclosed herein. It should be noted, however, that the foregoing are only example partition sizes and shapes, the present disclosure not being limited to any particular partition and partition shapes and/or sizes unless such a limit is mentioned or the context suggests such a limit, such as with the optional maximum efficiency size as mentioned. It should be noted that multiple alternative partitions may be provided as prediction candidates for the same image area as described below.

The prediction unit 316 may select previously decoded reference blocks. Then comparisons may be performed to determine if any of the reference blocks match a current block being reconstructed. This may involve hash matching, SAD search, or other comparison of image data, and so forth. Once a match is found with a reference block, the prediction unit 316 may use the image data of the one or more matching reference blocks to select a prediction mode. By one form, previously reconstructed image data of the reference block is provided as the prediction, but alternatively, the original pixel image data of the reference block could be provided as the prediction instead. Either choice may be used regardless of the type of image data that was used to match the blocks.

The predicted block then may be subtracted at subtractor 306 from the current block of original image data, and the resulting residual may be partitioned into one or more transform blocks (TUs) so that the transform and quantizer 308 can transform the divided residual data into transform coefficients using discrete cosine transform (DCT) for example. Using the quantization parameter (QP) set by the system 300, the transform and quantizer 308 then uses lossy resampling or quantization on the coefficients. The frames and residuals along with supporting or context data block size and intra displacement vectors and so forth may be entropy encoded by the coder 310 and transmitted to decoders.

In one or more embodiments, a system 300 may have, or may be, a decoder, and may receive coded video data in the form of a bitstream and that has the image data (chroma and luma pixel values) and as well as context data including residuals in the form of quantized transform coefficients and the identity of reference blocks including at least the size of the reference blocks, for example. The context also may include prediction modes for individual blocks, other partitions such as slices, inter-prediction motion vectors, partitions, quantization parameters, filter information, and so forth. The system 300 may process the bitstream with an entropy decoder 330 to extract the quantized residual coefficients as well as the context data. The system 300 then may use the inverse transform and quantizer 332 to reconstruct the residual pixel data.

The system 300 then may use an adder 334 (along with assemblers not shown) to add the residual to a predicted block. The system 300 also may decode the resulting data using a decoding technique employed depending on the coding mode indicated in syntax of the bitstream, and either a first path including a prediction unit 336 or a second path that includes a filter 338. The prediction unit 336 performs intra-prediction by using reference block sizes and the intra displacement or motion vectors extracted from the bitstream, and previously established at the encoder. The prediction unit 336 may utilize reconstructed frames as well as inter-prediction motion vectors from the bitstream to reconstruct a predicted block. The prediction unit 336 may set the correct prediction mode for each block, where the prediction mode may be extracted and decompressed from the compressed bitstream.

In one or more embodiments, the coded data 322 may include both video and audio data. In this manner, the system 300 may encode and decode both audio and video.

In one or more embodiments, while the coder 310 is generating the coded data 322, the system 300 may generate coding quality metrics indicative of visual quality (e.g., without requiring post-processing of the coded data 322 to assess the visual quality). Assessing the coding quality metrics may allow a control feedback such as BRC (e.g., facilitated by the control 321) to compare the number of bits spent to encode a frame to the coding quality metrics. When one or more coding quality metrics indicate poor quality (e.g., fail to meet a threshold value), such may require re-encoding (e.g., with adjusted parameters). The coding quality metrics may be based on a comparison of coded video to source video. The system 300 may compare a decoded version of the encoded image data to a pre-encoded version of the image data. Using the CUs or MB s of the encoded image data and the pre-encoded version of the image data, the system 300 may generate the coding quality metrics, which may be used as metadata for the corresponding video frames. The system 300 may use the coding quality metrics to adjust encoding parameters, for example, based on a perceived human response to the encoded video.

In one or more embodiments, the QPs used by the transform and quantizer 308 (and the inverse transform and quantizer 322) may be generated by the hardware encoder 152 of FIG. 1 (e.g., represented by the coder 310 functioning at least partially as hardware). In this manner, the QPs used by the transform and quantizer 308 may be generated by the hardware of the encoder rather than software. The control 321 may provide BRC, including the per-pixel block QPs 106 of FIG. 1, to be used to generate the QPs 158 of FIG. 1 for use by the used by the transform and quantizer 308.

It is understood that the above descriptions are for purposes of illustration and are not meant to be limiting.

FIG. 4 illustrates a flow diagram of illustrative process 400 for region-based adaptive quality tuning for video coding, in accordance with one or more example embodiments of the present disclosure.

At block 402, a device (e.g., the hardware encoder 152 of FIG. 1) may receive source video frames (e.g., the source video 104 of FIG. 1, from the content source 303 of FIG. 3). The source video frames may be raw source video (e.g., un-encoded video frames) and/or video frames that have previously been encoded. The source video frames may be associated with an application (e.g., the application 114 of FIG. 1), which may have some data regarding how much to compress certain regions (e.g., pixel blocks) of the respective frames (e.g., based on known objects, foreground and background pixels, etc.).

At block 404, the device may receive frame-level QPs (e.g., the BRC-generated frame-level QPs 110 of FIG. 1) for the respective video frames of the source video frames. Based on a target bitrate, the BRC of the graphics processor having the device may generate QPs at the frame level (e.g., on QP for an entire video frame). The frame-level QPs may be generated to achieve the target bitrate based on how much compression may be needed for a video frame to achieve the target bitrate.

At block 406, the device may receive a delta QP map (e.g., the delta QP map 156, the delta QP map 200 of FIG. 2) from the application associated with the source video frames. Instead of the device's software having to calculate region-based (e.g., pixel block-based) QPs for each pixel block of a frame based on the frame-level QPs and absolute QPs of each frame's region as set by the application, the application may generate and provide the delta QP map to indicate the delta (e.g., difference/change) in QP (e.g., with respect to the frame-level QP from the BRC). Any delta QP value of the delta QP map may correspond to a positive or negative (e.g., signed) value with which to aggregate in a sum of the delta QP value for the respective pixel block and the frame-level QP for the frame.

At block 408, the device may determine sums of the per-pixel block QPs from the delta QP map and the frame-level QP. For any pixel block of a frame, the QP of the pixel block (e.g., from the delta QP map) may be aggregated with the frame-level QP. The aggregation (e.g., sum) may be determined by the device for each pixel block of the frame to determine respective sums for each pixel block according to the equation: $QP_{Aggregate}=Clamp[QP_{BRC}+(\pm DeltaQP_{stream-in})]_{QP_{min}/QP_{max}}$, where $DeltaQP_{stream-in}$ is the delta QP streamed into the hardware encoder from the application (e.g., a positive/negative signed value), the $QP_{BRC}$ is the BRC-generated frame-level QP (e.g., unsigned value), and the $QP_{Aggregate}$ is the final QP used for bitstream encoding of a respective pixel block (e.g., an unsigned per-block value). Thus, the $QP_{Aggregate}$ equation may be used for each pixel block in a frame to generate the final QP to use in the encoding of the pixel block.

At block 410, the device may generate QPs for the respective pixel blocks of any frame. The QPs for a pixel block may be the sum of the per-pixel block QP and the frame-level QP according to the aggregation equation above. In this manner, rather than the delta QP map representing absolute QPs to be adjusted up or down to meet the frame-level QP, the delta QP map values represent modifications to the frame-level QP. For example, a negative delta QP value of the delta QP map indicates a QP decrease from the frame-level QP, and a positive delta QP value of the delta QP map indicates a QP increase from the frame-level QP. In this manner, some QPs of some pixel blocks may be increased, and some QPs of other pixel blocks of a same frame may be decreased using the aggregation equation above.

At block 412, the device may generate an encoded bitstream by encoding the source video frames using the QPs generated based on the aggregation of the delta QP maps for respective frames and the frame-level QPs for respective frames. In particular, the QPs for any pixel block of any frame may be used by the transform and quantizer 308 of FIG. 3 to generate and quantize the transform matrix used to compress the source video frames for generation of the encoded video frames of the bitstream.

It is understood that the above descriptions are for purposes of illustration and are not meant to be limiting.

Figure 5:
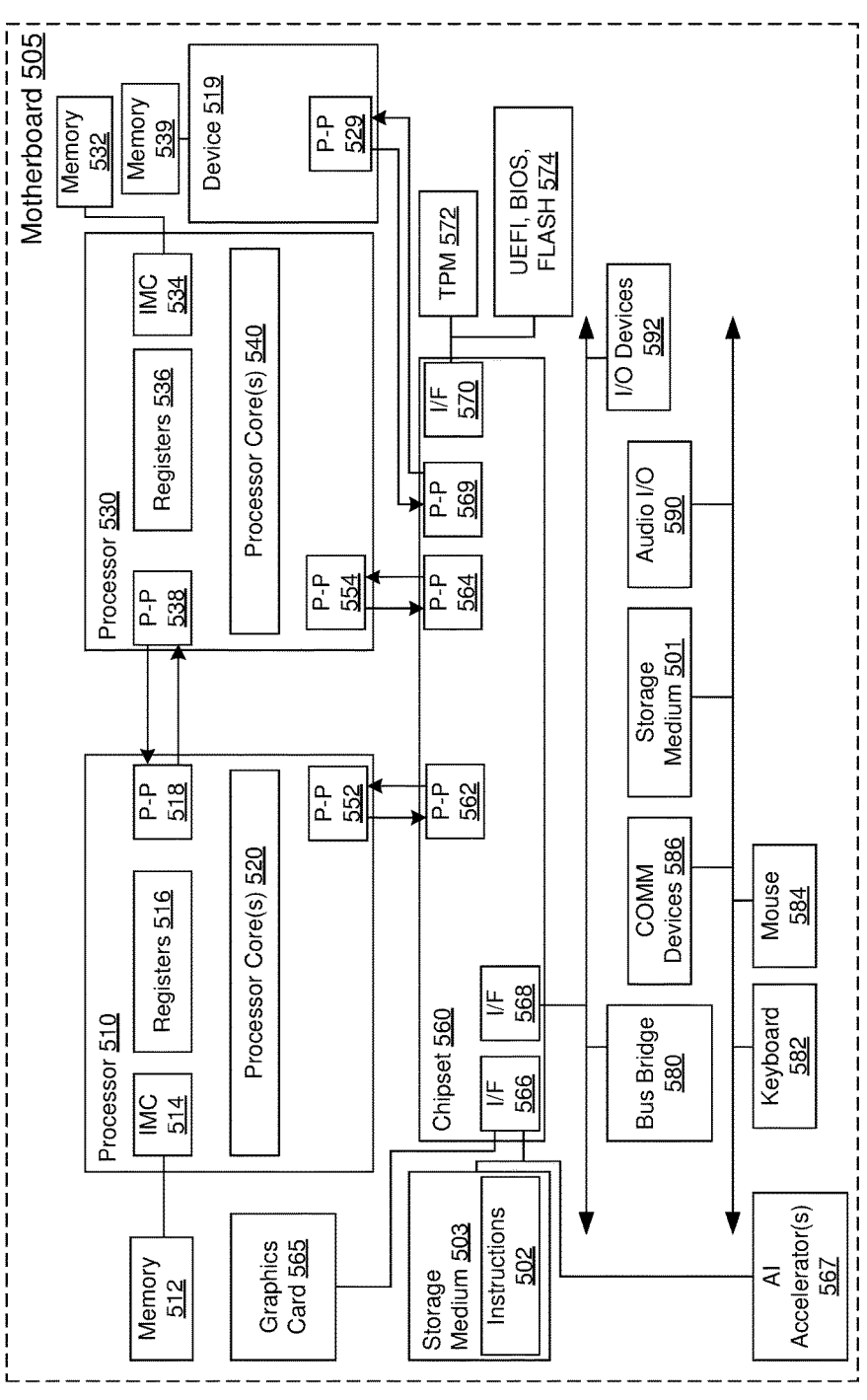
FIG. 5 illustrates an embodiment of an exemplary system, in accordance with one or more example embodiments of the present disclosure.

FIG. 5 illustrates an embodiment of an exemplary system 500, in accordance with one or more example embodiments of the present disclosure.

In various embodiments, the system 500 may comprise or be implemented as part of an electronic device.

In some embodiments, the system 500 may be representative, for example, of a computer system that implements one or more components of FIGS. 1 and 2.

The embodiments are not limited in this context. More generally, the system 500 is configured to implement all logic, systems, processes, logic flows, methods, equations, apparatuses, and functionality described herein and with reference to the figures.

The system 500 may be a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, hand-held device such as a personal digital assistant (PDA), or other devices for processing, displaying, or transmitting information. Similar embodiments may comprise, e.g., entertainment devices such as a portable music player or a portable video player, a smartphone or other cellular phones, a telephone, a digital video camera, a digital still camera, an external storage device, or the like. Further embodiments implement larger-scale server configurations. In other embodiments, the system 500 may have a single processor with one core or more than one processor. Note that the term "processor" refers to a processor with a single core or a processor package with multiple processor cores.

In at least one embodiment, the computing system 500 is representative of one or more components of FIG. 1. More generally, the computing system 500 is configured to implement all logic, systems, processes, logic flows, methods, apparatuses, and functionality described herein with reference to the above figures.

As used in this application, the terms "system" and "component" and "module" are intended to refer to a computer-related entity, either hardware, a combination of hardware and software, software, or software in execution, examples of which are provided by the exemplary system 500. For example, a component can be but is not limited to being, a process running on a processor, a processor, a hard disk drive, multiple storage drives (of optical and/or magnetic storage medium), an object, an executable, a thread of execution, a program, and/or a computer.

By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in this figure, system 500 comprises a motherboard 505 for mounting platform components. The motherboard 505 is a point-to-point (P-P) interconnect platform that includes a processor 510, a processor 530 coupled via a P-P interconnects/interfaces as an Ultra Path Interconnect (UPI), and a device 519. In other embodiments, the system 500 may be of another bus architecture, such as a multi-drop bus. Furthermore, each of processors 510 and 530 may be processor packages with multiple processor cores. As an example, processors 510 and 530 are shown to include processor core(s) 520 and 540, respectively. While the system 500 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processors 510 and the chipset 560. Some platforms may include additional components and some platforms may only include sockets to mount the processors and/or the chipset.

The processors 510 and 530 can be any of various commercially available processors, including without limitation an Intel® Celeron®, Core®, Core (2) Duo®, Itanium®, Pentium®, Xeon®, and XScale® processors; AMD® Athlon®, Duron®, and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi-processor architectures may also be employed as the processors 510, and 530.

The processor 510 includes an integrated memory controller (IMC) 514 and P-P interconnects/interfaces 518 and 552. Similarly, the processor 530 includes an IMC 534 and P-P interconnects/interfaces 538 and 554. The WIC's 514 and 534 couple the processors 510 and 530, respectively, to respective memories, a memory 512, and a memory 532. The memories 512 and 532 may be portions of the main memory (e.g., a dynamic random-access memory (DRAM)) for the platform such as double data rate type 3 (DDR3) or type 4 (DDR4) synchronous DRAM (SDRAM). In the present embodiment, the memories 512 and 532 locally attach to the respective processors 510 and 530.

In addition to the processors 510 and 530, the system 500 may include a device 519. The device 519 may be connected to chipset 560 by means of P-P interconnects/interfaces 529 and 569. The device 519 may also be connected to a memory 539. In some embodiments, the device 519 may be connected to at least one of the processors 510 and 530. In other embodiments, the memories 512, 532, and 539 may couple with the processor 510 and 530, and the device 519 via a bus and shared memory hub.

System 500 includes chipset 560 coupled to processors 510 and 530. Furthermore, chipset 560 can be coupled to storage medium 503, for example, via an interface (I/F) 566. The I/F 566 may be, for example, a Peripheral Component Interconnect-enhanced (PCI-e). The processors 510, 530, and the device 519 may access the storage medium 503 through chipset 560.

Storage medium 503 may comprise any non-transitory computer-readable storage medium or machine-readable storage medium, such as an optical, magnetic, or semiconductor storage medium. In various embodiments, storage medium 503 may comprise an article of manufacture. In some embodiments, storage medium 503 may store computer-executable instructions, such as computer-executable instructions 502 to implement one or more of processes or operations described herein, (e.g., process 400 of FIG. 4). The storage medium 503 may store computer-executable instructions for any equations depicted above. The storage medium 503 may further store computer-executable instructions for models and/or networks described herein, such as a neural network or the like. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable types of code, such as source code, compiled code, interpreted code, executable code, static code, dynamic code, object-oriented code, visual code, and the like. It should be understood that the embodiments are not limited in this context.

The processor 510 couples to a chipset 560 via P-P interconnects/interfaces 552 and 562 and the processor 530 couples to a chipset 560 via P-P interconnects/interfaces 554 and 564. Direct Media Interfaces (DMIs) may couple the P-P interconnects/interfaces 552 and 562 and the P-P interconnects/interfaces 554 and 564, respectively. The DMI may be a high-speed interconnect that facilitates, e.g., eight Giga Transfers per second (GT/s) such as DMI 3.0. In other embodiments, the processors 510 and 530 may interconnect via a bus.

The chipset 560 may comprise a controller hub such as a platform controller hub (PCH). The chipset 560 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 560 may comprise more than one controller hub such as a chipset with a memory controller hub, a graphics controller hub, and an input/output (I/O) controller hub.

In the present embodiment, the chipset 560 couples with a trusted platform module (TPM) 572 and the UEFI, BIOS, Flash component 574 via an interface (I/F) 570. The TPM 572 is a dedicated microcontroller designed to secure hardware by integrating cryptographic keys into devices. The UEFI, BIOS, Flash component 574 may provide pre-boot code.

Furthermore, chipset 560 includes the I/F 566 to couple chipset 560 with a high-performance graphics engine, graphics card 565. The graphics card 565 may implement one or more of processes or operations described herein, (e.g., process 400 of FIG. 4) and may include components of FIGS. 1-3. Because of the enhancements described herein to the graphics card 565, the graphics card 565 may generate human visual quality metrics for encoded video frames without having to offload the metrics generation, and may identify and select optimal encoding parameters within the graphics card 565. In other embodiments, the system 500 may include a flexible display interface (FDI) between the processors 510 and 530 and the chipset 560. The FDI interconnects a graphics processor core in a processor with the chipset 560.

Various I/O devices 592 couple to the bus 581, along with a bus bridge 580 that couples the bus 581 to a second bus 591 and an I/F 568 that connects the bus 581 with the chipset 560. In one embodiment, the second bus 591 may be a low pin count (LPC) bus. Various devices may couple to the second bus 591 including, for example, a keyboard 582, a mouse 584, communication devices 586, a storage medium 501, and an audio I/O 590.

The artificial intelligence (AI) accelerator 567 may be circuitry arranged to perform computations related to AI. The AI accelerator 567 may be connected to storage medium 501 and chipset 560. The AI accelerator 567 may deliver the processing power and energy efficiency needed to enable abundant data computing. The AI accelerator 567 is a class of specialized hardware accelerators or computer systems designed to accelerate artificial intelligence and machine learning applications, including artificial neural networks and machine vision. The AI accelerator 567 may be applicable to algorithms for robotics, internet of things, other data-intensive and/or sensor-driven tasks.

Many of the I/O devices 592, communication devices 586, and the storage medium 501 may reside on the motherboard 505 while the keyboard 582 and the mouse 584 may be add-on peripherals. In other embodiments, some or all the I/O devices 592, communication devices 586, and the storage medium 501 are add-on peripherals and do not reside on the motherboard 505.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, yet still co-operate or interact with each other.

In addition, in the foregoing Detailed Description, various features are grouped together in a single example to streamline the disclosure. This method of disclosure is not to be interpreted as reflecting an intention that the claimed examples require more features than are expressly recited in each claim. Rather, as the following claims reflect, the inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A data processing system suitable for storing and/or executing program code will include at least one processor coupled directly or indirectly to memory elements through a system bus. The memory elements can include local memory employed during actual execution of the program code, bulk storage, and cache memories that provide temporary storage of at least some program code to reduce the number of times code must be retrieved from bulk storage during execution. The term "code" covers a broad range of software components and constructs, including applications, drivers, processes, routines, methods, modules, firmware, microcode, and subprograms. Thus, the term "code" may be used to refer to any collection of instructions that, when executed by a processing system, perform a desired operation or operations.

Logic circuitry, devices, and interfaces herein described may perform functions implemented in hardware and implemented with code executed on one or more processors. Logic circuitry refers to the hardware or the hardware and code that implements one or more logical functions. Circuitry is hardware and may refer to one or more circuits. Each circuit may perform a particular function. A circuit of the circuitry may comprise discrete electrical components interconnected with one or more conductors, an integrated circuit, a chip package, a chipset, memory, or the like. Integrated circuits include circuits created on a substrate such as a silicon wafer and may comprise components. Integrated circuits, processor packages, chip packages, and chipsets may comprise one or more processors.

Processors may receive signals such as instructions and/or data at the input(s) and process the signals to generate at least one output. While executing code, the code changes the physical states and characteristics of transistors that make up a processor pipeline. The physical states of the transistors translate into logical bits of ones and zeros stored in registers within the processor. The processor can transfer the physical states of the transistors into registers and transfer the physical states of the transistors to another storage medium.

A processor may comprise circuits to perform one or more sub-functions implemented to perform the overall function of the processor. One example of a processor is a state machine or an application-specific integrated circuit (ASIC) that includes at least one input and at least one output. A state machine may manipulate the at least one input to generate the at least one output by performing a predetermined series of serial and/or parallel manipulations or transformations on the at least one input.

The logic as described above may be part of the design for an integrated circuit chip. The chip design is created in a graphical computer programming language, and stored in a computer storage medium or data storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher-level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a processor board, a server platform, or a motherboard, or (b) an end product.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Example 1 may be a method for generating quantization parameters for video encoding, the method comprising: receiving, at a hardware encoder, source video comprising video frames; receiving, at the hardware encoder, from software associated with the hardware encoder, a video frame-level quantization parameter for a first video frame of the video frames; receiving, at the hardware encoder, from an application, a delta quantization parameter map, the delta quantization parameter map comprising per-pixel block quantization parameter modifications for respective pixel blocks of the first video frame; determining, by the hardware encoder, for the respective pixel blocks, respective sums of the per-pixel block quantization parameter modifications and the video frame-level quantization parameter; generating, by the hardware encoder, quantization parameters for the respective pixel blocks, the quantization parameters comprising the respective sums; and generating, by the hardware encoder, an encoded bitstream based on the video frames and the quantization parameters.

Example 2 may include the method of example 1 and/or some other example herein, wherein determining the respective sums comprises: determining, for a first pixel block of the first video frame, a first sum of a first quantization parameter modification and the video frame-level quantization parameter; and determining, for a second pixel block of the first video frame, a second sum of a second quantization parameter modification and the video frame-level quantization parameter, wherein a first quantization parameter of the quantization parameters is the first sum, and wherein a second quantization parameter of the quantization parameters is the second sum.

Example 3 may include the method of example 1 and/or some other example herein, further comprising: receiving, at the hardware encoder, from the application, a second delta quantization parameter map, the second delta quantization parameter map comprising second per-pixel block quantization parameter modifications for second respective pixel blocks of a second video frame of the video frames; receiving, at the hardware encoder, from the software, a second video frame-level quantization parameter for the second video frame; determining, by the hardware encoder, for the second respective pixel blocks, second respective sums of the second per-pixel block quantization parameter modifications and the second video frame-level quantization parameter; generating, by the hardware encoder, second quantization parameters for the second respective pixel blocks, the second quantization parameters comprising the second respective sums; and generating, by the hardware encoder, a second encoded bitstream based on the video frames and the second quantization parameters.

Example 4 may include the method of example 3 and/or some other example herein, wherein a first pixel block of the respective pixel blocks is a same pixel block as a second pixel block of the second respective pixel blocks, wherein a first quantization parameter of the quantization parameters is associated with the first pixel block, wherein a second quantization parameter of the second quantization parameters is associated with the second pixel block, and wherein the first quantization parameter is equal to the second quantization parameter.

Example 5 may include the method of example 3 and/or some other example herein, wherein a first pixel block of the respective pixel blocks is a same pixel block as a second pixel block of the second respective pixel blocks, wherein a first quantization parameter of the quantization parameters is associated with the first pixel block, wherein a second quantization parameter of the second quantization parameters is associated with the second pixel block, and wherein the first quantization parameter is different than the second quantization parameter.

Example 6 may include the method of example 1 and/or some other example herein, wherein a first per-pixel block quantization parameter modification of the per-pixel block quantization parameter modifications is associated with a first pixel block of the respective pixel blocks, wherein a second per-pixel block quantization parameter modification of the per-pixel block quantization parameter modifications is associated with a second pixel block of the respective pixel blocks, and wherein the first per-pixel block quantization parameter modification is different than the second per-pixel block quantization parameter modification.

Example 7 may include the method of example 1 and/or some other example herein, wherein the per-pixel block quantization parameter modifications are based on a clamping function having a lower boundary and an upper boundary for the per-pixel block quantization parameter modifications.

Example 8 may include a non-transitory computer-readable medium storing computer-executable instructions which when executed by one or more processors result in performing operations comprising: receiving, at a hardware encoder, source video comprising video frames; receiving, at the hardware encoder, from software associated with the hardware encoder, a video frame-level quantization parameter for a first video frame of the video frames; receiving, at the hardware encoder, from an application, a delta quantization parameter map, the delta quantization parameter map comprising per-pixel block quantization parameter modifications for respective pixel blocks of the first video frame; determining, by the hardware encoder, for the respective pixel blocks, respective sums of the per-pixel block quantization parameter modifications and the video frame-level quantization parameter; generating, by the hardware encoder, quantization parameters for the respective pixel blocks, the quantization parameters comprising the respective sums; and generating, by the hardware encoder, an encoded bitstream based on the video frames and the quantization parameters.

Example 9 may include the non-transitory computer-readable medium of example 8 and/or some other example herein, wherein determining the respective sums comprises: determining, for a first pixel block of the first video frame, a first sum of a first quantization parameter modification and the video frame-level quantization parameter; and determining, for a second pixel block of the first video frame, a second sum of a second quantization parameter modification and the video frame-level quantization parameter, wherein a first quantization parameter of the quantization parameters is the first sum, and wherein a second quantization parameter of the quantization parameters is the second sum.

Example 10 may include the non-transitory computer-readable medium of example 8 and/or some other example herein, the operations further comprising: receiving, at the hardware encoder, from the application, a second delta quantization parameter map, the second delta quantization parameter map comprising second per-pixel block quantization parameter modifications for second respective pixel blocks of a second video frame of the video frames; receiving, at the hardware encoder, from the software, a second video frame-level quantization parameter for the second video frame; determining, by the hardware encoder, for the second respective pixel blocks, second respective sums of the second per-pixel block quantization parameter modifications and the second video frame-level quantization parameter; generating, by the hardware encoder, second quantization parameters for the second respective pixel blocks, the second quantization parameters comprising the second respective sums; and generating, by the hardware encoder, a second encoded bitstream based on the video frames and the second quantization parameters.

Example 11 may include the non-transitory computer-readable medium of example 10 and/or some other example herein, wherein a first pixel block of the respective pixel blocks is a same pixel block as a second pixel block of the second respective pixel blocks, wherein a first quantization parameter of the quantization parameters is associated with the first pixel block, wherein a second quantization parameter of the second quantization parameters is associated with the second pixel block, and wherein the first quantization parameter is equal to the second quantization parameter.

Example 12 may include the non-transitory computer-readable medium of example 10 and/or some other example herein, wherein a first pixel block of the respective pixel blocks is a same pixel block as a second pixel block of the second respective pixel blocks, wherein a first quantization parameter of the quantization parameters is associated with the first pixel block, wherein a second quantization parameter of the second quantization parameters is associated with the second pixel block, and wherein the first quantization parameter is different than the second quantization parameter.

Example 13 may include the non-transitory computer-readable medium of example 8 and/or some other example herein, wherein a first per-pixel block quantization parameter modification of the per-pixel block quantization parameter modifications is associated with a first pixel block of the respective pixel blocks, wherein a second per-pixel block quantization parameter modification of the per-pixel block quantization parameter modifications is associated with a second pixel block of the respective pixel blocks, and wherein the first per-pixel block quantization parameter modification is different than the second per-pixel block quantization parameter modification.

Example 14 may include the non-transitory computer-readable medium of example 8 and/or some other example herein, wherein the per-pixel block quantization parameter modifications are based on a clamping function having a lower boundary and an upper boundary for the per-pixel block quantization parameter modifications.

Example 15 may include a system for generating quantization parameters for video encoding, the system comprising at least one graphics processor coupled to memory, the at least one graphics processor configured to: receive, at a hardware encoder of the graphics processor, source video comprising video frames; receive, at the hardware encoder, from software associated with the hardware encoder, a video frame-level quantization parameter for a first video frame of the video frames; receive, at the hardware encoder, from an application, a delta quantization parameter map, the delta quantization parameter map comprising per-pixel block quantization parameter modifications for respective pixel blocks of the first video frame; determine, by the hardware encoder, for the respective pixel blocks, respective sums of the per-pixel block quantization parameter modifications and the video frame-level quantization parameter; generate, by the hardware encoder, quantization parameters for the respective pixel blocks, the quantization parameters comprising the respective sums; and generate, by the hardware encoder, an encoded bitstream based on the video frames and the quantization parameters.

Example 16 may include the system of example 15 and/or some other example herein, wherein to determine the respective sums comprises: determine, for a first pixel block of the first video frame, a first sum of a first quantization parameter modification and the video frame-level quantization parameter; and determine, for a second pixel block of the first video frame, a second sum of a second quantization parameter modification and the video frame-level quantization parameter, wherein a first quantization parameter of the quantization parameters is the first sum, and wherein a second quantization parameter of the quantization parameters is the second sum.

Example 17 may include the system of example 15 and/or some other example herein, wherein the at least one graphics processor is further configured to: receive, at the hardware encoder, from the application, a second delta quantization parameter map, the second delta quantization parameter map comprising second per-pixel block quantization parameter modifications for second respective pixel blocks of a second video frame of the video frames; receive, at the hardware encoder, from the software, a second video frame-level quantization parameter for the second video frame; determine, by the hardware encoder, for the second respective pixel blocks, second respective sums of the second per-pixel block quantization parameter modifications and the second video frame-level quantization parameter; generate, by the hardware encoder, second quantization parameters for the second respective pixel blocks, the second quantization parameters comprising the second respective sums; and generate, by the hardware encoder, a second encoded bitstream based on the video frames and the second quantization parameters.

Example 18 may include the system of example 17 and/or some other example herein, wherein a first pixel block of the respective pixel blocks is a same pixel block as a second pixel block of the second respective pixel blocks, wherein a first quantization parameter of the quantization parameters is associated with the first pixel block, wherein a second quantization parameter of the second quantization parameters is associated with the second pixel block, and wherein the first quantization parameter is equal to the second quantization parameter.

Example 19 may include the system of example 17 and/or some other example herein, wherein a first pixel block of the respective pixel blocks is a same pixel block as a second pixel block of the second respective pixel blocks, wherein a first quantization parameter of the quantization parameters is associated with the first pixel block, wherein a second quantization parameter of the second quantization parameters is associated with the second pixel block, and wherein the first quantization parameter is different than the second quantization parameter.

Example, 20 may include the system of example 15 and/or some other example herein, wherein a first per-pixel block quantization parameter modification of the per-pixel block quantization parameter modifications is associated with a first pixel block of the respective pixel blocks, wherein a second per-pixel block quantization parameter modification of the per-pixel block quantization parameter modifications is associated with a second pixel block of the respective pixel blocks, and wherein the first per-pixel block quantization parameter modification is different than the second per-pixel block quantization parameter modification.

Example 21 may include an apparatus comprising means for: receiving, at a hardware encoder, source video comprising video frames; receiving, at the hardware encoder, from software associated with the hardware encoder, a video frame-level quantization parameter for a first video frame of the video frames; receiving, at the hardware encoder, from an application, a delta quantization parameter map, the delta quantization parameter map comprising per-pixel block quantization parameter modifications for respective pixel blocks of the first video frame; determining, by the hardware encoder, for the respective pixel blocks, respective sums of the per-pixel block quantization parameter modifications and the video frame-level quantization parameter; generating, by the hardware encoder, quantization parameters for the respective pixel blocks, the quantization parameters comprising the respective sums; and generating, by the hardware encoder, an encoded bitstream based on the video frames and the quantization parameters.

Example 22 may include one or more non-transitory computer-readable media comprising instructions to cause an electronic device, upon execution of the instructions by one or more processors of the electronic device, to perform one or more elements of a method described in or related to any of examples 1-21, or any other method or process described herein.

Example 23 may include an apparatus comprising logic, modules, and/or circuitry to perform one or more elements of a method described in or related to any of examples 1-21, or any other method or process described herein.

Example 24 may include a method, technique, or process as described in or related to any of examples 1-21, or portions or parts thereof.

Example 25 may include an apparatus comprising: one or more processors and one or more computer readable media comprising instructions that, when executed by the one or more processors, cause the one or more processors to perform the method, techniques, or process as described in or related to any of examples 1-21, or portions thereof.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A method for generating quantization parameters for video encoding, the method comprising:

obtaining a frame-level quantization parameter for a first video frame;

obtaining a plurality of quantization parameter adjustment values corresponding respectively to a plurality of pixel blocks of the first video frame, the quantization parameter adjustment values relative to the frame-level quantization parameter;

generating, by a hardware encoder, respective block-level quantization parameters for corresponding ones of the pixel blocks based on (i) respective sums of the frame-level quantization parameter with corresponding ones of the quantization parameter adjustment values and (ii) a clamping function having a lower boundary and an upper boundary for the block-level quantization parameters; and generating, by the hardware encoder, an encoded bitstream based on the first video frame and the block-level quantization parameters.

2. The method of claim 1, including:

determining, for a first one of the pixel blocks of the first video frame, a first sum of a first one of the quantization parameter adjustment values and the frame-level quantization parameter; and determining, for a second one of the pixel blocks of the first video frame, a second sum of a second one of the quantization parameter adjustment values and the frame-level quantization parameter, wherein a first block-level quantization parameter of the block-level quantization parameters is based on the first sum, and wherein a second block-level quantization parameter of the block-level quantization parameters is based on the second sum.

3. The method of claim 1, wherein the pixel blocks are first pixel blocks, the frame-level quantization parameter is a first frame-level quantization parameter, the quantization parameter adjustment values are first quantization parameter adjustment values, and including:

obtaining second quantization parameter adjustment values corresponding respectively to a plurality of second pixel blocks of a second video frame;

obtaining a second frame-level quantization parameter for the second video frame;

generating, by the hardware encoder, respective second block-level quantization parameters for corresponding ones of the second pixel blocks based on respective second sums of the second frame-level quantization parameter with corresponding ones of the second quantization parameter adjustment values; and generating, by the hardware encoder, a second encoded bitstream based on the second video frame and the second block-level quantization parameters.

4. The method of claim 3, wherein a first pixel block of the first pixel blocks corresponds to a second pixel block of the second pixel blocks, a first block-level quantization parameter of the first block-level quantization parameters is associated with the first pixel block, a second block-level quantization parameter of the second block-level quantization parameters is associated with the second pixel block, and the first block-level quantization parameter is equal to the second block-level quantization parameter.

5. The method of claim 3, wherein a first pixel block of the first pixel blocks corresponds to a second pixel block of the second pixel blocks, a first block-level quantization parameter of the first block-level quantization parameters is associated with the first pixel block, a second block-level quantization parameter of the second block-level quantization parameters is associated with the second pixel block, and the first block-level quantization parameter is different than the second block-level quantization parameter.

6. The method of claim 1, wherein a first quantization parameter adjustment value of the quantization parameter adjustment values is associated with a first pixel block of the pixel blocks, a second quantization parameter adjustment value of the quantization parameter adjustment values is associated with a second pixel block of the pixel blocks, and the first quantization parameter adjustment value is different than the second quantization parameter adjustment value.

7. A non-transitory computer-readable medium comprising computer-executable instructions to cause at least one programmable circuit to at least:

obtain a frame-level quantization parameter for a first video frame;

obtain a plurality of quantization parameter adjustment values corresponding respectively to a plurality of pixel blocks of the first video frame, the quantization parameter adjustment values relative to the frame-level quantization parameter;

generate respective block-level quantization parameters for corresponding ones of the pixel blocks based on (i) respective sums of the frame-level quantization parameter with corresponding ones of the quantization parameter adjustment values and (ii) a clamping function having a lower boundary and an upper boundary for the block-level quantization parameters; and generate an encoded bitstream based on the first video frame and the block-level quantization parameters.

8. The non-transitory computer-readable medium of claim 7, wherein the instructions are to cause one or more of the at least one programmable circuit to:

determine, for a first one of the pixel blocks of the first video frame, a first sum of a first one of the quantization parameter adjustment values and the frame-level quantization parameter; and determine, for a second one of the pixel blocks of the first video frame, a second sum of a second one of the quantization parameter adjustment values and the frame-level quantization parameter, wherein a first block-level quantization parameter of the block-level quantization parameters is based on the first sum, and wherein a second block-level quantization parameter of the block-level quantization parameters is based on the second sum.

9. The non-transitory computer-readable medium of claim 7, wherein the pixel blocks are first pixel blocks, the frame-level quantization parameter is a first frame-level quantization parameter, the quantization parameter adjustment values are first quantization parameter adjustment values, and the instructions are to cause one or more of the at least one programmable circuit to:

obtain second quantization parameter for adjustment values corresponding respectively to a plurality of second pixel blocks of a second video frame;

obtain a second frame-level quantization parameter for the second video frame;

generate respective second block-level quantization parameters for corresponding ones of the second pixel blocks based on respective second sums of the second frame-level quantization parameter with corresponding ones of the second quantization parameter adjustment values; and generate a second encoded bitstream based on the second video frame and the second block-level quantization parameters.

10. The non-transitory computer-readable medium of claim 9, wherein a first pixel block of the first pixel blocks corresponds to a second pixel block of the second pixel blocks, a first block-level quantization parameter of the first block-level quantization parameters is associated with the first pixel block, a second block-level quantization parameter of the second block-level quantization parameters is associated with the second pixel block, and the first block-level quantization parameter is equal to the second block-level quantization parameter.

11. The non-transitory computer-readable medium of claim 9, wherein a first pixel block of the first pixel blocks corresponds to a second pixel block of the second pixel blocks, a first block-level quantization parameter of the first block-level quantization parameters is associated with the first pixel block, a second block-level quantization parameter of the second block-level quantization parameters is associated with the second pixel block, and the first block-level quantization parameter is different than the second block-level quantization parameter.

12. The non-transitory computer-readable medium of claim 7, wherein a first quantization parameter adjustment value of the quantization parameter adjustment values is associated with a first pixel block of the pixel blocks, a second quantization parameter adjustment value of the quantization parameter adjustment values is associated with a second pixel block of the pixel blocks, and the first quantization parameter adjustment value is different than the second quantization parameter adjustment value.

13. The non-transitory computer-readable medium of claim 7, wherein the quantization parameter adjustment values are signed values, the lower boundary is a first positive value and the upper boundary is a second positive value larger than the first positive value.

14. A system comprising:

interface circuitry;

instructions; and at least one programmable circuit to be programmed based on the instructions to:

obtain a frame-level quantization parameter for a first video frame;

obtain a plurality of quantization parameter adjustment values corresponding respectively to a plurality of pixel blocks of the first video frame, the quantization parameter adjustment values relative to the frame-level quantization parameter;

generate respective block-level quantization parameters for corresponding ones of the pixel blocks based on (i) respective sums of the frame-level quantization parameter with corresponding ones of the quantization parameter adjustment values and (ii) a clamping function having a lower boundary and an upper boundary for the block-level quantization parameters; and generate an encoded bitstream based on the first video frame and the block-level quantization parameters.

15. The system of claim 14, wherein one or more of the at least one programmable circuit is to:

determine, for a first one of the pixel blocks of the first video frame, a first sum of a first one of the quantization parameter adjustment values and the frame-level quantization parameter; and determine, for a second one of the pixel blocks of the first video frame, a second sum of a second one of the quantization parameter adjustment values and the frame-level quantization parameter, wherein a first block-level quantization parameter of the block-level quantization parameters is based on the first sum, and wherein a second block-level quantization parameter of the block-level quantization parameters is based on the second sum.

16. The system of claim 14, wherein the pixel blocks are first pixel blocks, the frame-level quantization parameter is a first frame-level quantization parameter, the quantization parameter adjustment values are first quantization parameter adjustment values, and one or more of the at least one programmable circuit is to:

obtain second quantization parameter adjustment values corresponding respectively to a plurality of second pixel blocks of a second video frame;

obtain a second frame-level quantization parameter for the second video frame;

generate respective second block-level quantization parameters for corresponding ones of the second pixel blocks based on respective second sums of the second frame-level quantization parameter with corresponding ones of the second quantization parameter adjustment values; and generate a second encoded bitstream based on the second video frame and the second block-level quantization parameters.

17. The system of claim 16, wherein a first pixel block of the first pixel blocks corresponds to a second pixel block of the second pixel blocks, a first block-level quantization parameter of the first block-level quantization parameters is associated with the first pixel block, a second block-level quantization parameter of the second block-level quantization parameters is associated with the second pixel block, and the first block-level quantization parameter is equal to the second block-level quantization parameter.

18. The system of claim 16, wherein a first pixel block of the pixel blocks corresponds to a second pixel block of the second pixel blocks, a first block-level quantization parameter of the first block-level quantization parameters is associated with the first pixel block, a second block-level quantization parameter of the second block-level quantization parameters is associated with the second pixel block, and the first block-level quantization parameter is different than the second block-level quantization parameter.

19. The system of claim 14, wherein a first quantization parameter adjustment value of the quantization parameter adjustment values is associated with a first pixel block of the pixel blocks, a second quantization parameter adjustment value of the quantization parameter adjustment values is associated with a second pixel block of the pixel blocks, and the first quantization parameter adjustment value is different than the second quantization parameter adjustment value.

20. The system of claim 14, wherein the quantization parameter adjustment values are signed values, the lower boundary is a first positive value and the upper boundary is a second positive value larger than the first positive value.

* * * * *